United States Patent
Kubota et al.

(10) Patent No.: US 10,839,127 B2
(45) Date of Patent: Nov. 17, 2020

(54) TEMPERATURE CALCULATION METHOD, INFORMATION PROCESSING DEVICE, AND NON-TRANSITORY RECORDING MEDIUM STORING TEMPERATURE CALCULATION PROGRAM

(71) Applicant: FUJITSU LIMITED, Kawasaki (JP)

(72) Inventors: Tetsuyuki Kubota, Yokohama (JP); Akira Ueda, Yokohama (JP); Hideharu Matsushita, Yokohama (JP); akihiro otsuka, Yokohama (JP); Yasuhiro Ite, Chofu (JP); Takamasa Shinde, Kawasaki (JP); Kazuhisa Inagaki, Yokohama (JP); Akira Sakai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 829 days.

(21) Appl. No.: 15/350,614

(22) Filed: Nov. 14, 2016

(65) Prior Publication Data
US 2017/0220720 A1    Aug. 3, 2017

(30) Foreign Application Priority Data
Feb. 3, 2016 (JP) ................ 2016-019343

(51) Int. Cl.
*G06F 30/367* (2020.01)
*G06F 119/08* (2020.01)

(52) U.S. Cl.
CPC ........ *G06F 30/367* (2020.01); *G06F 2119/08* (2020.01)

(58) Field of Classification Search
CPC .... G06F 17/5009; G06F 30/20; G06F 30/367; G06F 2119/08

(Continued)

(56) References Cited

U.S. PATENT DOCUMENTS

2002/0121960 A1* 9/2002 Ando ............... H01C 7/13
338/21
2009/0106714 A1* 4/2009 Culp ................. G06F 17/5045
716/106

(Continued)

FOREIGN PATENT DOCUMENTS

| JP | H05-266151 | 10/1993 |
|---|---|---|
| JP | 2001-188821 | 7/2001 |

OTHER PUBLICATIONS

Funato, Hiroki, Takashi Suga, and Michihiko Suhara. "Model-based analysis of screw locations to reduce radiation from a PCB-chassis structure." 2014 IEEE International Symposium on Electromagnetic Compatibility (EMC). IEEE, 2014. pp. 123-127. (Year: 2014).*

(Continued)

*Primary Examiner* — Kamini S Shah
*Assistant Examiner* — John E Johansen
(74) *Attorney, Agent, or Firm* — Fujitsu Patent Center

(57) ABSTRACT

A temperature calculation method for a substrate, the temperature calculation method includes: calculating, by a computer performing a circuit simulation based on a resistance equivalent to a component that joins two substrates included in a target model of an analysis, a value of a current that flows through the component or voltage values in respective end portions of the component; setting, based on model information for expressing the target model, the current value or the voltage values in a first surface and a second surface that are included in surfaces of an outer shape of the component and that are in contact with the respective substrates; and calculating a first current density distribution of the component by performing a first electrical analysis according to the setting.

9 Claims, 14 Drawing Sheets

(58) Field of Classification Search
USPC .......................................................... 703/14
See application file for complete search history.

(56) References Cited

U.S. PATENT DOCUMENTS

2012/0271602 A1* 10/2012 Han ...................... G06F 30/367
703/2
2012/0316857 A1* 12/2012 Kuo ...................... G06F 30/367
703/14
2014/0181770 A1* 6/2014 Ogawa ................... G06F 30/39
716/112

OTHER PUBLICATIONS

Suwa, Tohru, and Hamid Hadim. "Multidisciplinary placement optimization of heat generating electronic components on a printed circuit board in an enclosure." IEEE Transactions on Components and Packaging Technologies 30.3 (2007). pp. 402-410. (Year: 2007).*

* cited by examiner

FIG. 7

| ELEMENT NUMBER | ELECTRICAL CONDUCTIVITY (UNIT/S/m) |
|---|---|
| 1 | 4.6E9 |
| 2 | 2.3E10 |
| 3 | 8.5E9 |
| ... | ... |

FIG. 8

| NODE NUMBER OF SURFACE A | VOLTAGE (UNIT V) |
|---|---|
| 13 | 1 |
| 16 | 1 |
| ... | ... |

| NODE NUMBER OF SURFACE B | VOLTAGE (UNIT V) |
|---|---|
| 143 | 0 |
| 341 | 0 |
| ... | ... |

| NODE NUMBER OF SURFACE A | VOLTAGE (UNIT[V]) | CURRENT(UNIT[mA]) |
|---|---|---|
| 13 | 3 | 1.1 |
| 16 | 3 | 1.1 |
| ... | ... | |

| NODE NUMBER OF SURFACE B | VOLTAGE (UNIT[V]) | CURRENT(UNIT[mA]) |
|---|---|---|
| 143 | 0.3 | 1.1 |
| 341 | 0.3 | 1.1 |
| ... | ... | ... |

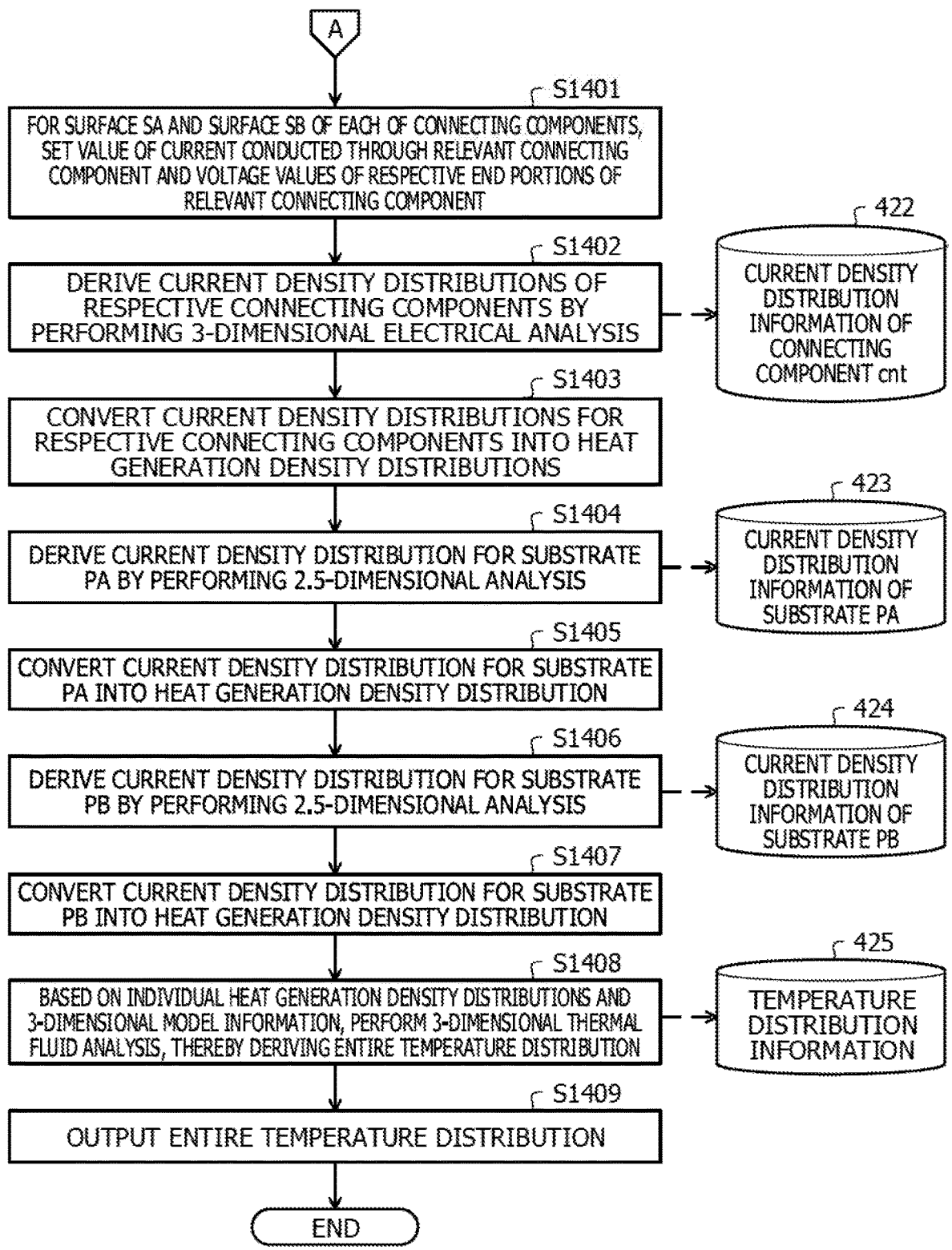

TEMPERATURE CALCULATION METHOD, INFORMATION PROCESSING DEVICE, AND NON-TRANSITORY RECORDING MEDIUM STORING TEMPERATURE CALCULATION PROGRAM

CROSS-REFERENCE TO RELATED APPLICATION

This application is based upon and claims the benefit of priority of the prior Japanese Patent Application No. 2016-019343, filed on Feb. 3, 2016, the entire contents of which are incorporated herein by reference.

FIELD

The embodiments discussed herein are related to a temperature calculation method, an information processing device, and a non-transitory recording medium storing a temperature calculation program.

BACKGROUND

In in-vehicle electronic devices and so forth, high-density mounted electronic devices are used under high-temperature environments.
A related technology is disclosed in Japanese Laid-open Patent Publication No. 5-266151 or Japanese Laid-open Patent Publication No. 2001-188821.

SUMMARY

According to an aspect of the embodiments, a temperature calculation method for a substrate, the temperature calculation method includes: calculating, by a computer performing a circuit simulation based on a resistance equivalent to a component that joins two substrates included in a target model of an analysis, a value of a current that flows through the component or voltage values in respective end portions of the component; setting, based on model information for expressing the target model, the current value or the voltage values in a first surface and a second surface that are included in surfaces of an outer shape of the component and that are in contact with the respective substrates; and calculating a first current density distribution of the component by performing a first electrical analysis according to the setting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates an example of a setting of electrical conductivities;

FIG. 8 illustrates an example of a setting of voltage values at a time of deriving an electrical resistance;

FIG. 10 illustrates an example of a setting of current values and voltage values at a time of deriving a current density distribution of a connecting component;

FIG. 14 illustrates an example of the temperature calculation processing performed by the information processing device.

DESCRIPTION OF EMBODIMENTS

At a time of, for example, designing a substrate, an increasing temperature is predicted by using a 3-dimensional thermal fluid analysis.

Based on, for example, boundary conditions of a space including printed circuit boards within a device housing, the boundary conditions being calculated from a result of a 3-dimensional thermal analysis of the device housing, a thermal analysis of mounted components on the printed circuit boards is performed. From, for example, pieces of substrate layout setting data, connection source substrate layout setting data serving as an starting point of an inter-substrate connection setting and connection destination substrate layout setting data serving as an ending point thereof are individually selected and extracted, thereby generating inter-substrate connection information, and waveform analysis information is extracted, thereby performing an entire waveform analysis.

At a time of, for example, performing a 3-dimensional thermal fluid analysis of a substrate, a heat source is set based on a density distribution of a current conducted through a substrate obtained based on a 2.5-dimensional analysis.

In the 2.5-dimensional analysis, a current density distribution including a connecting component such as, for example, a bus bar or a connector which connects substrates is not obtained. Therefore, it may be difficult to obtain a temperature distribution of an entire circuit board including the connecting component.

Figure 1:
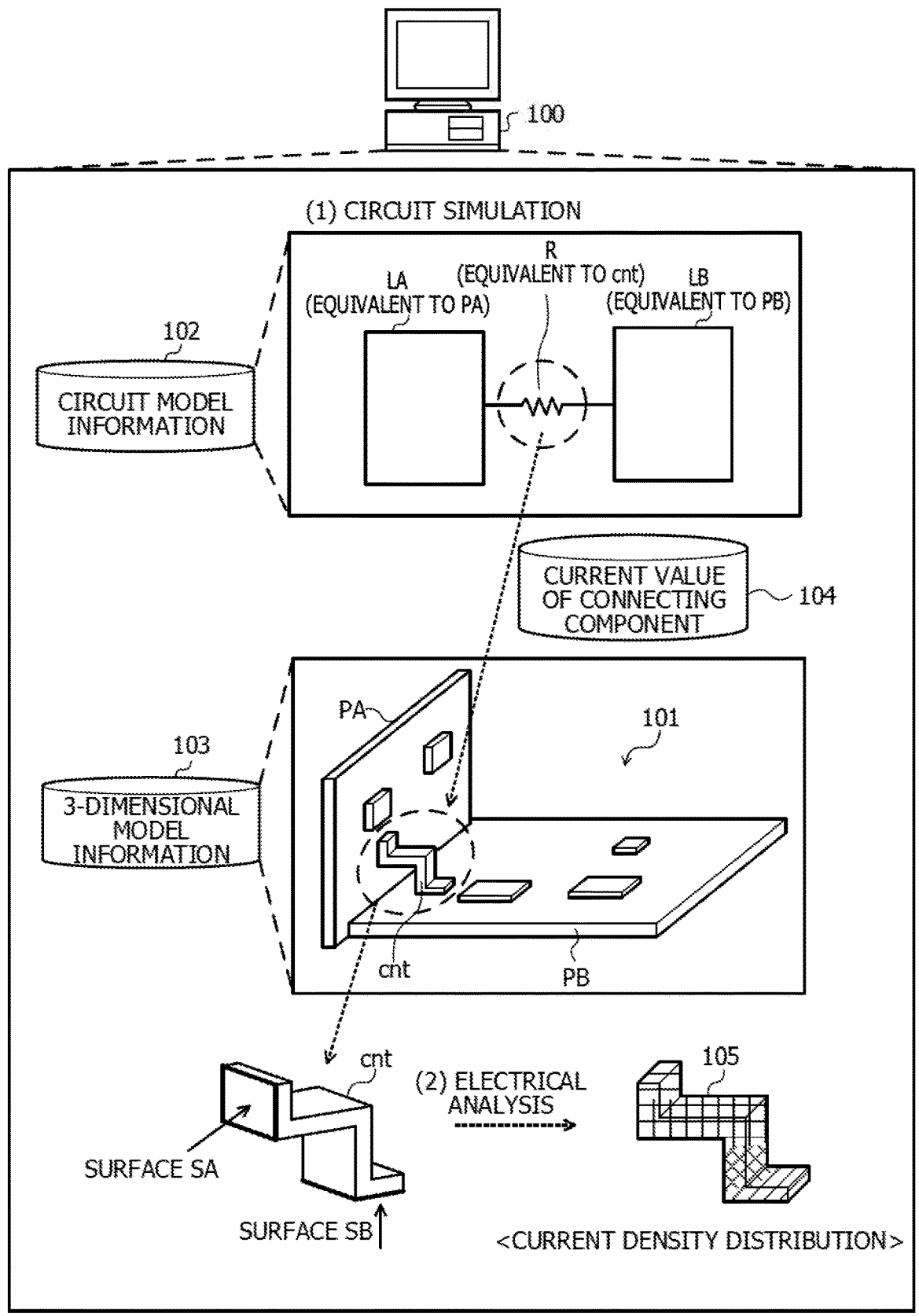
FIG. 1 illustrates an example of an operation of an information processing device.

FIG. 1 illustrates an example of an operation of an information processing device. An information processing device 100 may be a computer to calculate temperature distributions of two substrates including a component for connecting the two substrates included in a target model of an analysis. The information processing device 100 executes a temperature distribution calculation program for the substrates.

The target model of an analysis is provided in a simulation space. The simulation space is a virtual 3-dimensional space simulated on the computer. Specifically, the simulation space is, for example, a space virtually set within the information processing device 100 in order to perform a design or an analysis of a 3-dimensional object. In the simulation space, a 3-dimensional orthogonal coordinate system having, for example, an X-axis, a Y-axis, a and Z-axis is defined. The object may be, for example, a product including substrates and so forth and is not specifically limited. In FIG. 1, the object includes a substrate PA, a substrate PB, and a connecting component cnt to connect the substrate PA and the substrate PB to each other.

By using, for example, computer aided design (CAD), a developer creates 3-dimensional model information of a 3-dimensional model that has a 3-dimensional shape and that expresses the object by use of polygons. The 3-dimensional model information may include, for example, coordinate data of the polygons, and so forth. Before actually creating the object, the developer simulates, on the computer by using computer aided engineering (CAE), whether a designed object satisfies demand performances. Here, the CAE may include 3 pieces of software called a preprocessor, a solver, and a postprocessor.

The preprocessor of the CAE performs element division and defines boundary conditions, thereby creating 3-dimensional model information 103 for expressing a 3-dimensional model 101. The solver of the CAE may be a structural analysis solver to perform a numerical analysis on the 3-dimensional model 101 expressed by the 3-dimensional model information 103. The postprocessor of the CAE visualizes an analysis result obtained by the solver of the CAE.

The information processing device 100 may perform portion of processing related to the preprocessor of the CAE and the solver of the CAE.

Figure 2:
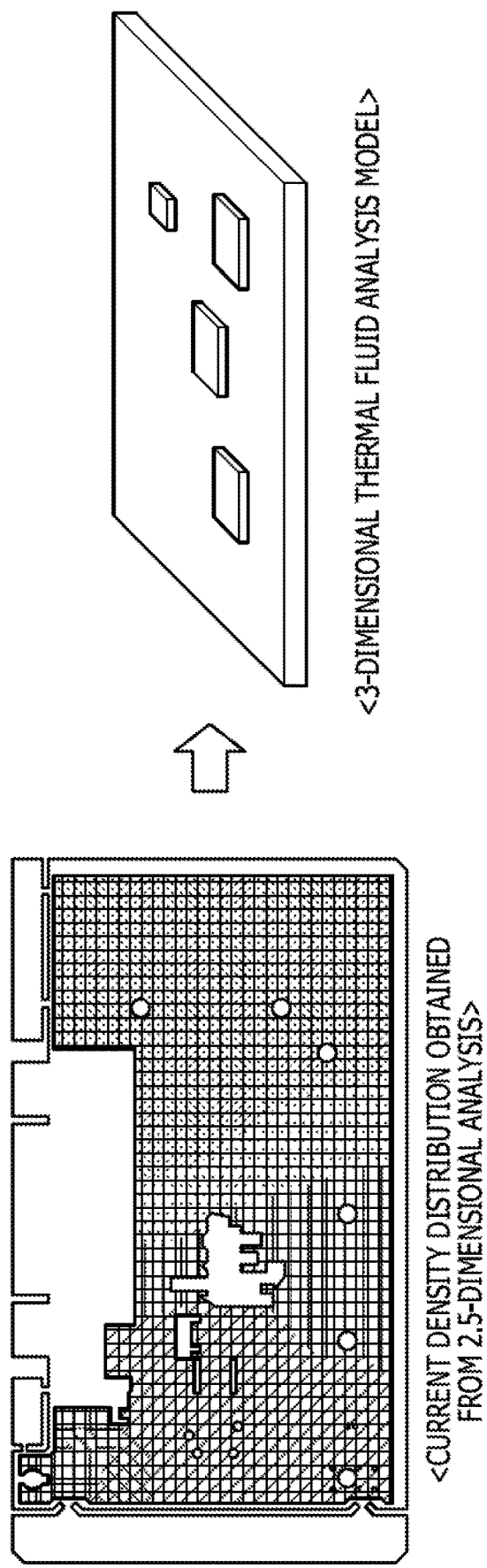
FIG. 2 illustrates an example of a 3-dimensional thermal fluid analysis model based on a current density distribution obtained by a 2.5-dimensional analysis.

FIG. 2 illustrates an example of a 3-dimensional thermal fluid analysis model based on a current density distribution obtained by a 2.5-dimensional analysis. As illustrated in, for example, FIG. 2, in the 2.5-dimensional analysis, a current density distribution including a component such as a bus bar or a connector which connects substrates is not obtained. Therefore, no temperature distribution of an entire circuit board including the connecting component cnt may be obtained. The 2.5-dimensional analysis may be an analysis based on, for example, a PEEK method or the like and has 5 degrees of freedom, for example. In the 2.5-dimensional analysis, vias establishing connections between, for example, layers of substrates are replaced with resistances, thereby performing an analysis.

Based on a 3-dimensional electrical analysis in which a value of a current of the component for connecting the two substrates, calculated from a circuit analysis, is set in surfaces of the component, the surfaces being in contact with the respective substrates, the information processing device 100 calculates a current density distribution of the component. Based on the current density distribution of the connecting component cnt, a temperature distribution of the connecting component cnt is obtained.

As illustrated in (1) in FIG. 1, by using a circuit simulation based on a resistance equivalent to the component for connecting the two substrates included in the target model of an analysis, the information processing device 100 calculates a value of the current that flows through the component. Therefore, a current value 104 of the connecting component is obtained. The target model of an analysis may be the 3-dimensional model 101 illustrated in FIG. 1. The component may be the connecting component cnt. The value of a resistance equivalent to the connecting component cnt may be, for example, a catalog value serving as a performance announced from a catalog or the like by a maker that manufactures the connecting component cnt. The value of the resistance equivalent to the connecting component cnt may be, for example, a value of a resistance, calculated from the 3-dimensional electrical analysis.

The circuit simulation may be a simulation of an analog operation of a circuit. A SPICE simulator or the like may be used, for example. Circuit model information 102 is described by a simulation program with integrated circuit emphasis (SPICE) description format for expressing a circuit model including a circuit LA equivalent to the substrate PA, a circuit LB equivalent to the substrate PB, and a resistance R equivalent to the connecting component cnt. Based on the circuit model information 102, the information processing device 100 performs a circuit simulation, thereby deriving a value of a current flowing through the resistance R, as the value of a current conducted through the connecting component cnt.

By performing, based on the 3-dimensional model information 103, an electrical analysis in a case of setting values of currents calculated for respective 2 surfaces that are in contact with the respective two substrates and that are included in surfaces of an outer shape of the connecting component cnt, the information processing device 100 calculates a current density distribution in the connecting component cnt. A surface that is in contact with the substrate PA and that is included in the surfaces of the outer shape of the connecting component cnt is a surface SA, and a surface that is in contact with the substrate PB and that is included in the surfaces of the outer shape of the connecting component cnt is a surface SB.

Since current density distribution in the connecting component cnt is obtained, a temperature distribution based on the current density distribution is set in the connecting component cnt at a time of a thermal fluid analysis of substrates. Therefore, temperature information of the substrates including the connecting component cnt is obtained.

As illustrated in FIG. 2, the current density distribution obtained from the 2.5-dimensional analysis is obtained in a single substrate. However, in the 2.5-dimensional analysis, a current density distribution including a component such as, for example, a bus bar or a connector which connects substrates is not obtained.

Figure 3:
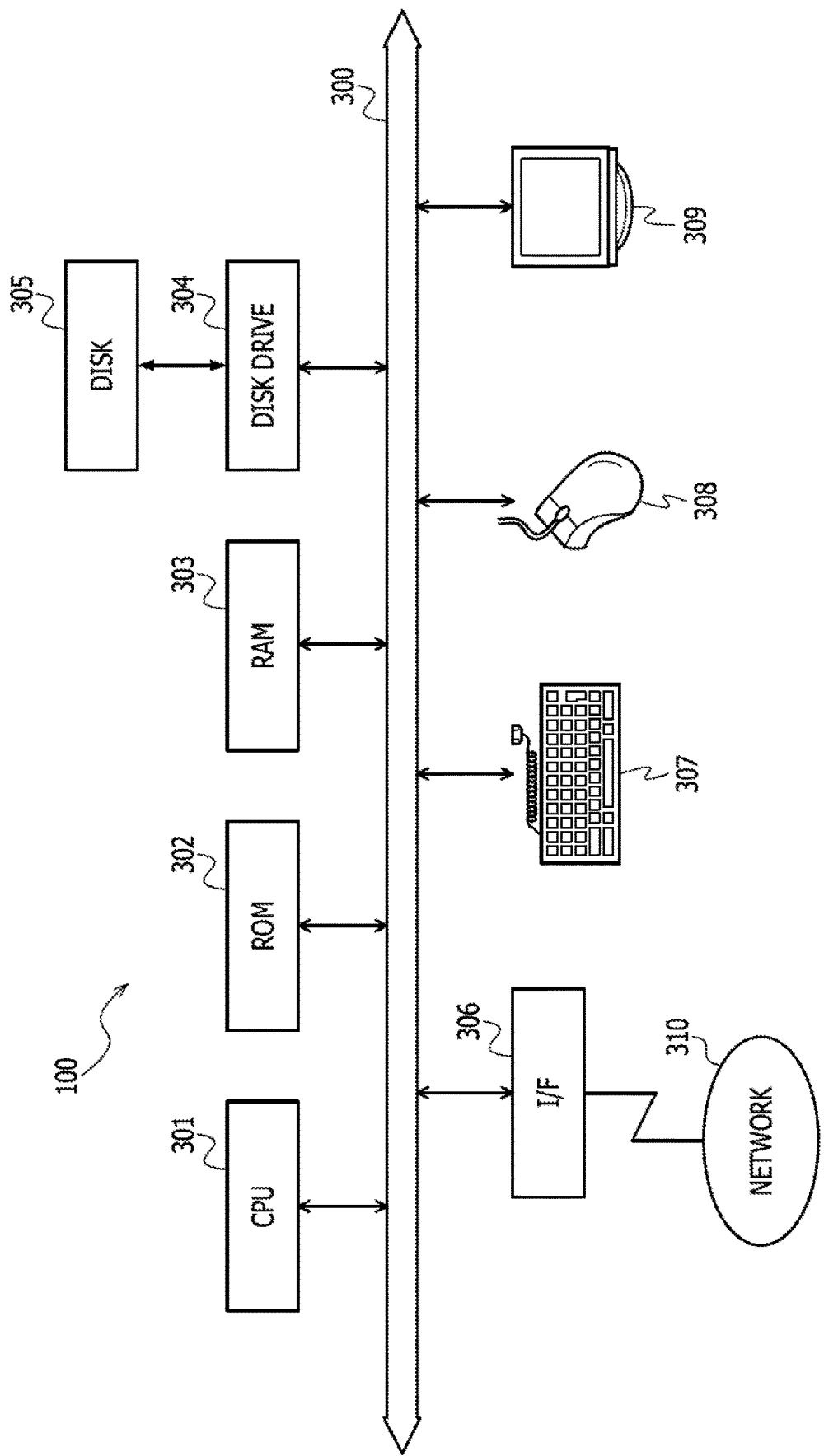
FIG. 3 illustrates an example of a hardware configuration of the information processing device.

FIG. 3 illustrates an example of a hardware configuration of the information processing device. The information processing device 100 may be, for example, a personal computer (PC).

The information processing device 100 includes a central processing unit (CPU) 301, a read only memory (ROM) 302, and a random access memory (RAM) 303. The information processing device 100 includes a disk drive 304, a disk 305, an inter/face (I/F) 306, a keyboard 307, a mouse 308, and a display 309. The CPU 301, the ROM 302, the RAM 303, the disk drive 304, the I/F 306, the keyboard 307, the mouse 308, and the display 309 are connected to one another by a bus 300.

The CPU 301 manages control of the entire information processing device 100. The ROM 302 stores therein programs such as a boot program and a design support program. The RAM 303 is used as a work area of the CPU 301. In accordance with control from the CPU 301, the disk drive 304 controls read/write of data, performed on the disk 305. The disk 305 stores therein data written based on control from the disk drive 304. The disk 305 may store therein a program such as, for example, the design support program. As the disk 305, a magnetism disk, an optical disk, or the like is used. The CPU 301 reads the design support program and so forth, stored in the ROM 302 or the disk 305, thereby performing processing coded in the design support program.

The I/F 306 is connected to a network 310 such as a local area network (LAN), a wide area network (WAN), or the Internet via a communication line and is connected to another via the network 310. In addition, the I/F 306 manages an interface between the network 310 and the inside and controls inputting and outputting of data from and to an external device. As the I/F 306, for example, a modem, a LAN adapter, or the like may be adopted.

Each of the keyboard 307 and the mouse 308 is an interface that performs inputting of various kinds of data, in accordance with an operation of a user. The display 309 is an interface that outputs data in accordance with an instruction from the CPU 301.

The information processing device 100 may include an input device to import images and moving images from a camera, and an input device to import sounds from a microphone. The information processing device 100 may include an output device such as a printer. The information processing device 100 may include, for example, a solid state drive (SSD), a semiconductor memory, and so forth.

The information processing device 100 may be a PC, a server, or the like and is not specifically limited. In a case where the information processing device 100 is the server, the information processing device 100, a device operable by a user, the display 309, and so forth may be connected to one another via the network 310. The information processing device 100 may be applied to, for example, a virtual desktop infrastructure (VDI) system and so forth. The server performs processing based on, for example, the information processing device 100, and a client terminal displays a screen corresponding to the processing.

In a case where the information processing device 100 is the PC, some processing operations out of processing operations based on the information processing device 100 may be performed by the server. The 3-dimensional electrical analysis, the 2.5-dimensional analysis, and so forth may be performed by, for example, the PC, and the 3-dimensional thermal fluid analysis and so forth may be performed by the server.

Figure 4:
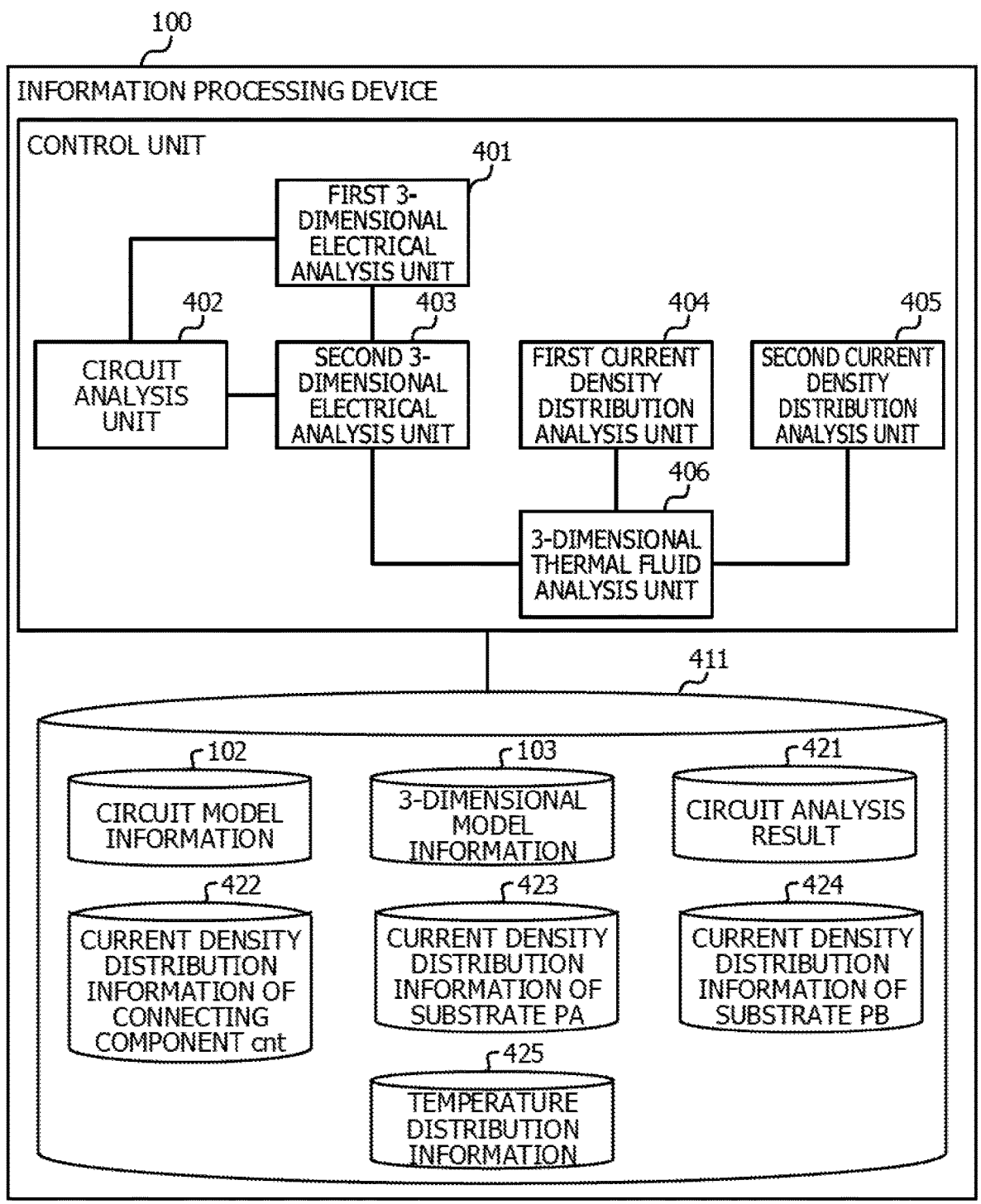
FIG. 4 illustrates an example of a functional configuration of the information processing device.

FIG. 4 illustrates an example of a functional configuration of the information processing device. The information processing device 100 includes a first 3-dimensional electrical analysis unit 401, a circuit analysis unit 402, a second 3-dimensional electrical analysis unit 403, a first current density distribution analysis unit 404, a second current density distribution analysis unit 405, and a 3-dimensional thermal fluid analysis unit 406. Processing in a control unit including the first 3-dimensional electrical analysis unit 401 to the 3-dimensional thermal fluid analysis unit 406 may be coded in a program stored in a storage unit 411 such as, for example, the ROM 302, the RAM 303, or the disk 305 accessible by the CPU 301 and illustrated in FIG. 3. The CPU 301 reads the relevant program from the storage unit 411, thereby executing the processing coded in the program. From this, the processing in the control unit is realized. A processing result of the control unit may be stored in the storage unit 411 such as, for example, the RAM 303, the ROM 302, or the disk 305.

Figure 5:
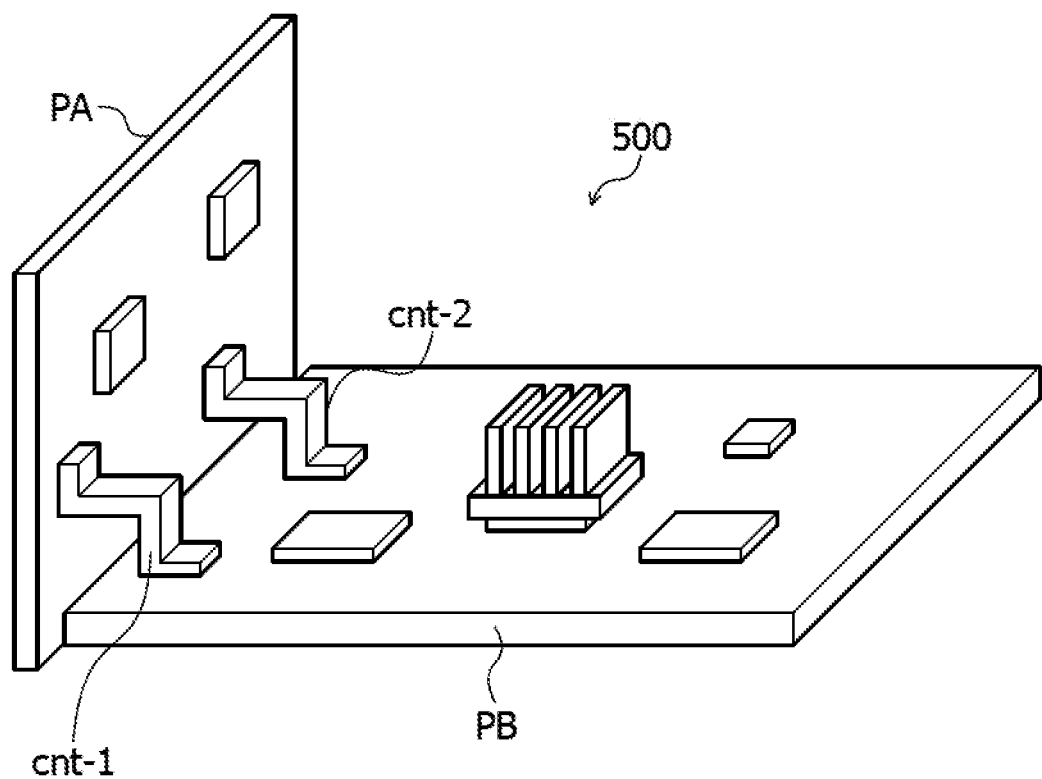
FIG. 5 illustrates an example of a 3-dimensional model.

FIG. 5 illustrates an example of a 3-dimensional model. A 3-dimensional model 500 is obtained by modeling an object serving as a design target to be provided in a simulation space. The 3-dimensional model 500 includes, for example, the substrate PA, the substrate PB, and a connecting component cnt-1 and a connecting component cnt-2 that each connect the substrate PA and the substrate PB to each other. In a case of indicating one component of the connecting component cnt-1 and the connecting component cnt-2, the connecting component cnt-1 or the connecting component cnt-2 may be shortened and called a connecting component cnt. A space of an analysis target including a 3-dimensional object designed by the CAD or the like is divided into meshes by using grid points, thereby modeling the space of the analysis target. In, for example, a structural analysis, an electromagnetic field analysis, or a fluid analysis, which uses a computer, a numerical analysis in which an equation is solved for each of grid points is performed. Information for expressing the 3-dimensional model 500 may be called the 3-dimensional model information 103.

Figure 6:
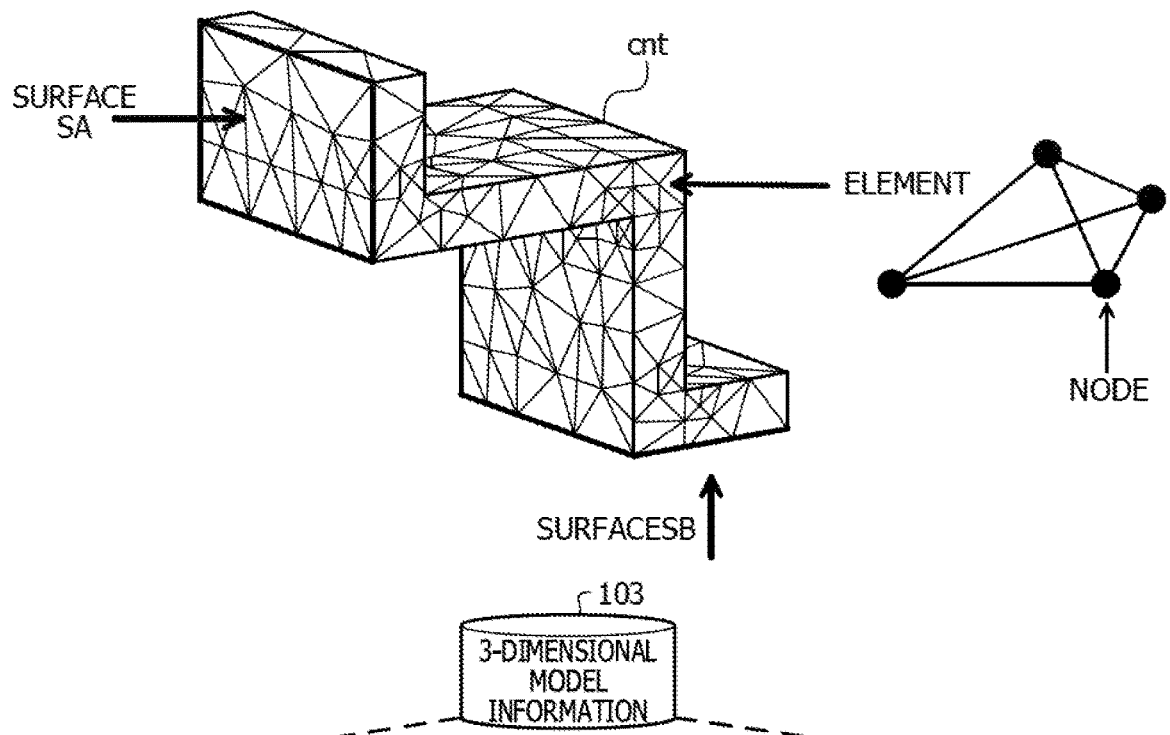
FIG. 6 illustrates an example of a data structure in 3-dimensional model information.

FIG. 6 illustrates an example of a data structure in 3-dimensional model information. The 3-dimensional model information 103 is information for expressing the 3-dimensional model 500 serving as an analysis target. In FIG. 6, a portion of one of the connecting components cnt will be described. In the 3-dimensional model 500, an object serving as an analysis target is divided into elements serving as small fine areas, and an entire shape is illustrated as a group of elements. The elements each include nodes. Each of the nodes is a vertex of an element, an intermediate point of a side between vertices of elements, or the like. The 3-dimensional model information 103 includes, for example, node information 601 illustrated in (1) in FIG. 6 and element information 602 illustrated in (2) in FIG. 6. The 3-dimensional model information 103 is stored in, for example, the storage unit 411.

The node information 601 illustrated in (1) in FIG. 6 includes, for each of nodes included in elements, position information of the relevant node, for example. The node information 601 includes fields of a node number, an x-coordinate, a y-coordinate, and a z-coordinate. In the field of the node number, node numbers for identifying respective nodes are set. In the field of the x-coordinate, values of the x-coordinate in the X-axis out of 3 axes of X, Y, and Z that are perpendicular to one another and that are defined in the simulation space are set. In the field of the y-coordinate, values of the y-coordinate in the Y-axis out of the 3 axes of X, Y, and Z that are perpendicular to one another and that are defined in the simulation space are set. In the field of the z-coordinate, values of the z-coordinate in the Z-axis out of the 3 axes of X, Y, and Z that are perpendicular to one another and that are defined in the simulation space are set. The node numbers may range from 1 to Nn, for example. In a case where the node number is, for example, "1", the value of the x-coordinate is "n1x", the value of the y-coordinate is "n1y", and the value of the z-coordinate is "n1z".

The element information 602 illustrated in (2) in FIG. 6 is information for indicating, for each of elements, nodes included in the relevant node, for example. The element information 602 includes fields in which node numbers included in the elements are settable, for example.

As the 3-dimensional model information 103, the element information 602 of elements included in the 3-dimensional model 500, node points included in the elements, position information of the node points, and so forth are cited. Information for indicating a shape of the 3-dimensional model 500 may be pieces of information such as, for example, a volume and a surface area. The 3-dimensional model information 103 may include information for indicating, for example, a material of the model. The 3-dimensional model information 103 may include, for example, information of boundary conditions to be set in the 3-dimensional model 500 at a time of an analysis.

Based on, for example, the 3-dimensional model information 103, the first 3-dimensional electrical analysis unit 401 illustrated in FIG. 4 extracts surfaces that are in contact with the respective substrate PA and substrate PB and that are included in individual surfaces of the connecting component cnt. In FIG. 6, surfaces in which the two substrates PA and PB are in contact with the connecting component cnt are the respective surface SA and surface SB.

Based on the 3-dimensional model information 103, the first 3-dimensional electrical analysis unit 401 performs an electrical analysis in a case where predetermined different voltage values are set in the respective extracted surfaces, and thus the first 3-dimensional electrical analysis unit 401 calculates a value of a resistance equivalent to the connecting component cnt.

FIG. 7 illustrates an example of a setting of electrical conductivities. In setting information 700, an electrical conductivity is set for each of the elements included in the connecting component cnt, as a physical property value of the connecting component cnt at a time of obtaining the value of the electrical resistance by performing the 3-dimensional electrical analysis. In FIG. 7, an electrical conductivity is set for each of the elements included in the connecting component cnt. However, an electrical conductivity may be set for each of the nodes included in the connecting component cnt. In FIG. 7, in a case where the element number is, for example, "1", the electrical conductivity is 4.6E9 [S/m].

FIG. 8 illustrates an example of a setting of voltage values at a time of deriving an electrical resistance. At a time of deriving the electrical resistance between the surface SA and the surface SB, the first 3-dimensional electrical analysis unit 401 sets the surface SA and the surface SB to respective different electric potentials. In setting information 800, the surface SA is set to 1 [V], and the surface SB is set to 0 [V]. While, in FIG. 8, the first 3-dimensional electrical analysis unit 401 sets voltage values in nodes included in the surface SA and the surface SB, the first 3-dimensional electrical analysis unit 401 may set voltage values in, for example, surfaces of elements included in the surface SA and the surface SB.

Based on the set electrical conductivities and the set voltage values, the first 3-dimensional electrical analysis unit 401 performs the 3-dimensional electrical analysis, thereby calculating a value of a current that flows between the surface SA and the surface SB. Based on the calculated current value and the set voltage values, the first 3-dimensional electrical analysis unit 401 derives the value of the electrical resistance between the surface SA and the surface SB by using Ohm's law. The Ohm's law is Resistance=Voltage/Current.

Based on the resistance equivalent to the connecting component cnt, the circuit analysis unit 402 illustrated in FIG. 4 performs a circuit simulation, thereby calculating the value of the current that flows through the connecting component cnt. The value of the resistance equivalent to the connecting component cnt may be, for example, the value of a resistance defined in the connecting component cnt or may be the value of the resistance calculated by the first 3-dimensional electrical analysis unit 401 as described above. The value of the resistance defined in the connecting component cnt may be, for example, a catalog value serving as a performance announced from a catalog or the like by a maker that manufactures the connecting component cnt.

Figure 9:
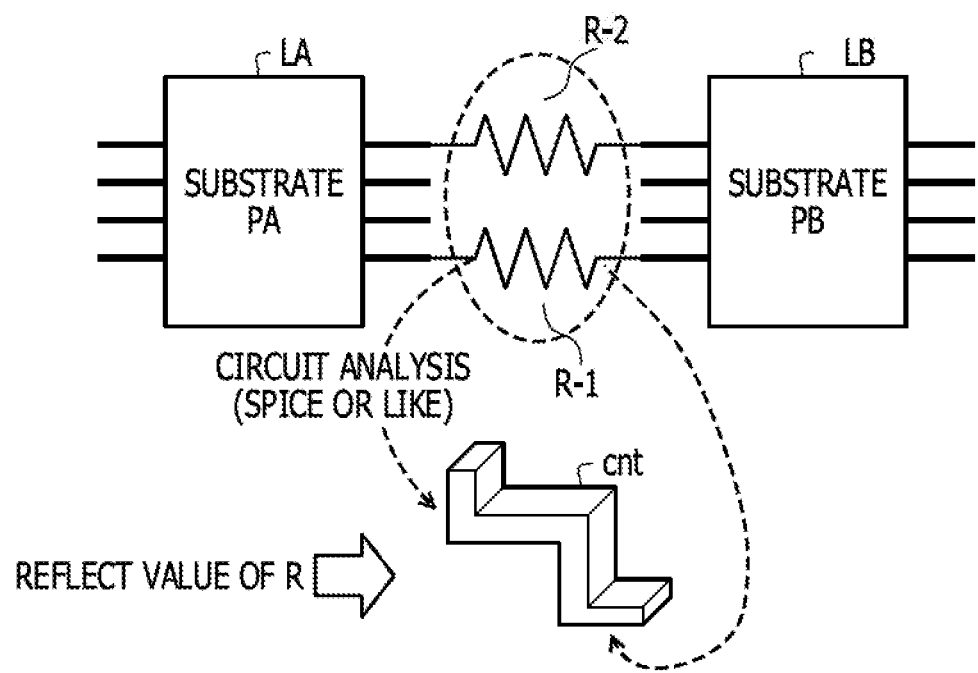
FIG. 9 illustrates an example of a circuit analysis.

FIG. 9 illustrates an example of a circuit analysis. Based on the circuit model information 102, the circuit analysis unit 402 performs a circuit simulation in a case where the value of the resistance equivalent to the connecting component cnt is set to the value of a resistance, calculated by the first 3-dimensional electrical analysis unit 401. The circuit simulation may be, for example, a simulation of an analog operation of a circuit. For the circuit simulation, a circuit simulator such as, for example, the SPICE may be used.

In the circuit model information 102, a circuit model including the circuit LA equivalent to the substrate PA, the circuit LB equivalent to the substrate PB, a resistance R-1 equivalent to the connecting component cnt-1, and a resistance R-2 equivalent to the connecting component cnt-2 is described in the description format of the SPICE or the like. In a case of indicating one of the resistance R-1 and the resistance R-2, the resistance R-1 or the resistance R-2 may be shortened and called a resistance R. Based on the circuit analysis unit 402, a value of a current conducted through the corresponding one of the connecting component cnt and values of voltages in respective end portions of the relevant connecting component cnt are obtained. Values of voltages calculated for respective end portions of each of the resistances R become the values of voltages in respective end portions of the corresponding one of the connecting components cnt, for example. The value of the current that flows through the corresponding one of the resistances R becomes the value of the current conducted through the corresponding one of the connecting components cnt, for example. A circuit analysis result obtained by the circuit analysis unit 402 is stored in the storage unit 411. The circuit analysis result includes the current value 104 of each of the connecting components cnt, the voltage values of the relevant connecting component cnt, and so forth.

By performing, based on the 3-dimensional model information 103, the 3-dimensional electrical analysis in a case of setting values of currents calculated for respective surfaces in which the two substrates are in contact with the connecting components cnt, the second 3-dimensional electrical analysis unit 403 calculates current density distributions in the respective connecting components cnt. Based on the 3-dimensional model information 103, regarding each of the connecting components cnt, the second 3-dimensional electrical analysis unit 403 illustrated in, for example, FIG. 4 sets, for each of the surface SA and the surface SB, a value of a current or a value of a voltage, obtained, as a boundary condition of the relevant connecting component cnt, based on a circuit analysis performed by the circuit analysis unit 402.

FIG. 10 illustrates an example of a setting of current values or voltage values at a time of deriving a current density distribution of a connecting component. In setting information 1000, as values of voltages, the surface SA is set to 3 [V], and the surface SB is set to 0.3 [V], or alternatively, as values of currents, both the surface SA and the surface SB are set to 1.1 [mA].

The second 3-dimensional electrical analysis unit 403 illustrated in FIG. 4 performs the 3-dimensional electrical analysis, thereby deriving a current density distribution of each of the connecting components cnt in a case of setting the surface SA and the surface SB to respective values of currents and respective values of voltages, analyzed by the circuit analysis unit 402.

Figure 11:
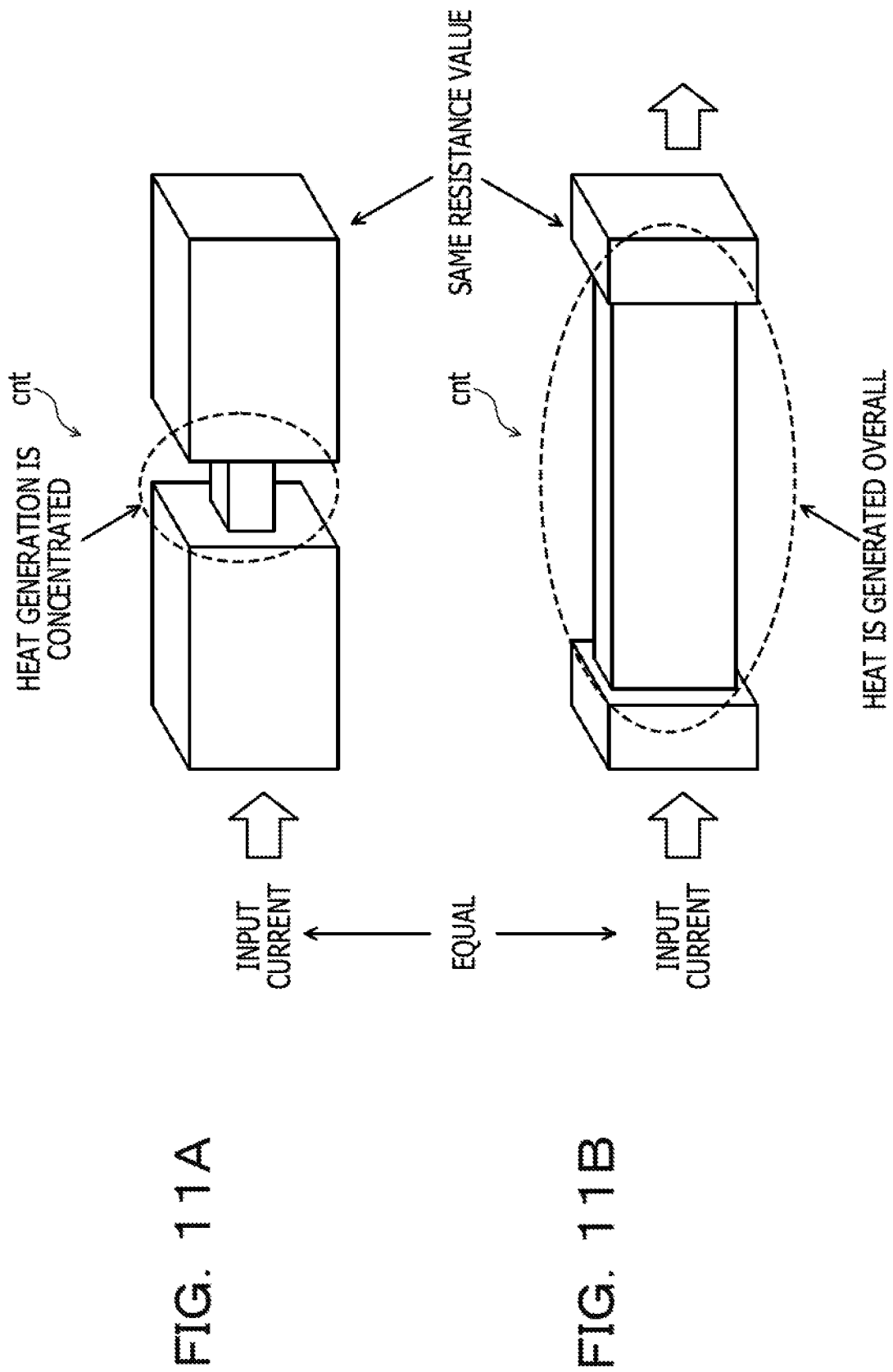
FIG. 11A and FIG. 11B each illustrate an example of a 3-dimensional electrical analysis.

FIG. 11A and FIG. 11B each illustrate an example of a 3-dimensional electrical analysis. Even in a case of the same input current and the same resistance value, if the shape of the corresponding one of the connecting components cnt varies, a current density distribution varies. Therefore, the second 3-dimensional electrical analysis unit 403 performs the 3-dimensional electrical analysis, thereby deriving the current density distribution. FIG. 11A and FIG. 11B illustrate examples in which heat generation density distributions are different in a case where the corresponding one of the connecting components cnt has 2 different shapes. The shape of the corresponding one of the connecting components cnt, illustrated in FIG. 11A, is thin only in the middle, whereas the shape of the relevant connecting components cnt, illustrated in FIG. 11B, is thin except for portions near the respective surface SA and surface SB.

Even in a case of the same input current and the same resistance value, in such a shape of a connector as illustrated in FIG. 11A, heat generation is concentrated in the middle. In contrast, in such a shape of a connector as illustrated in FIG. 11B, heat is generated overall. In this way, by performing the 3-dimensional electrical analysis, a high-accuracy current density distribution is obtained in accordance with the shape of each of the connecting components cnt. Information for indicating the current density distribution of each of the connecting components cnt, obtained by the second 3-dimensional electrical analysis unit 403, is stored in storage unit 411, as the current density distribution information 422 of the relevant connecting component cnt.

Based on the 3-dimensional model information 103, the first current density distribution analysis unit 404 performs the 2.5-dimensional analysis, thereby deriving a current density distribution for the substrate PA. Information for indicating the current density distribution for the substrate PA, obtained by the first current density distribution analysis unit 404, is stored in the storage unit 411, as the current density distribution information 423 of the substrate PA.

Based on the 3-dimensional model information 103, the second current density distribution analysis unit 405 performs the 2.5-dimensional analysis, thereby deriving a current density distribution for the substrate PB. Information for indicating the current density distribution for the substrate PB, obtained by the second current density distribution analysis unit 405, is stored in the storage unit 411, as the current density distribution information 424 of the substrate PB.

Based on current density distributions for the respective substrates and current density distributions for the respective connecting components cnt, the 3-dimensional thermal fluid analysis unit 406 performs the 3-dimensional thermal fluid analysis, thereby deriving an entire temperature distribution.

Figure 12:
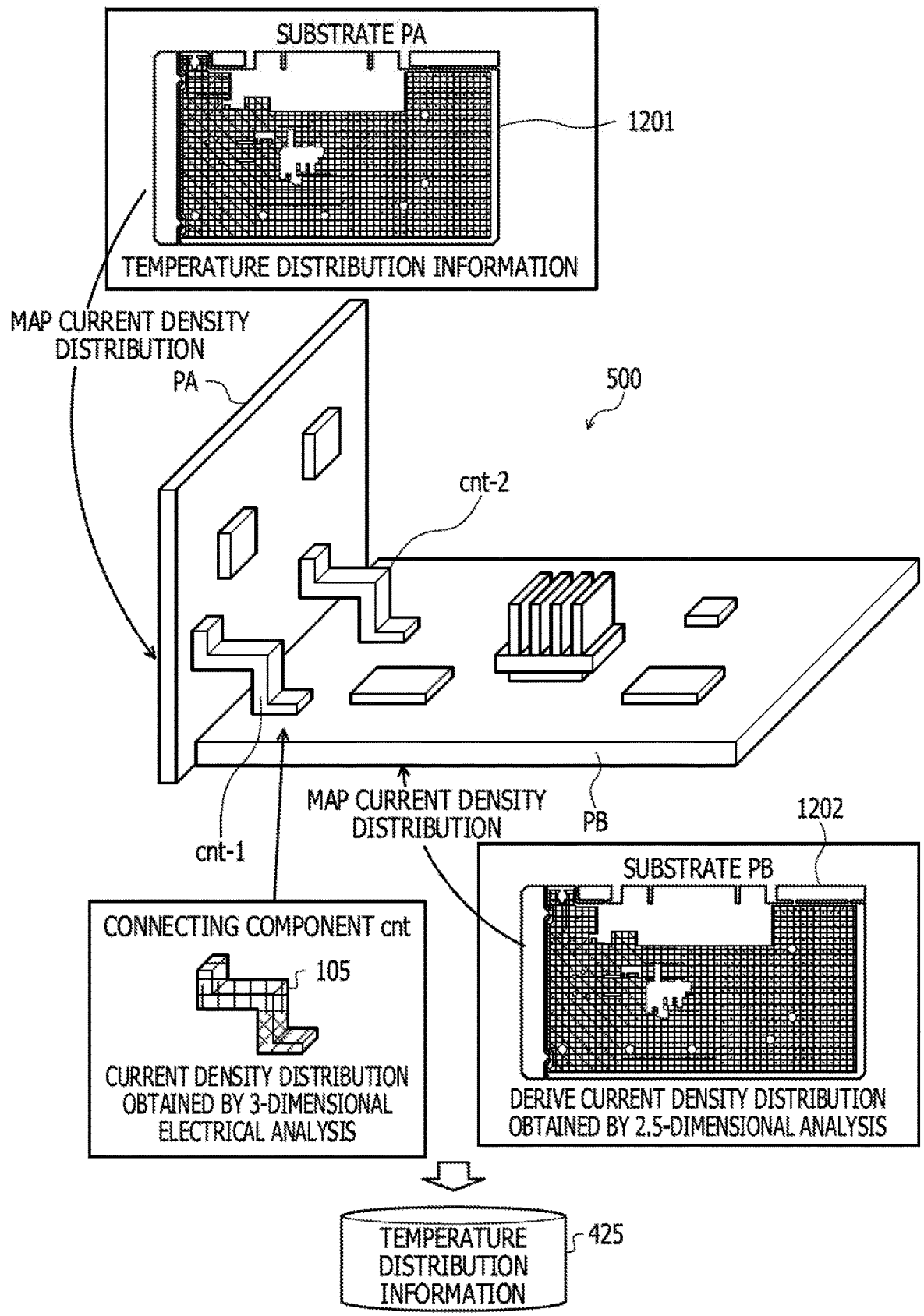
FIG. 12 illustrates examples of mappings of respective current density distributions.

FIG. 12 illustrates examples of mappings of respective current density distributions. The 3-dimensional thermal fluid analysis unit 406 maps, to the 3-dimensional model 500 expressed by the 3-dimensional model information 103, a current density distribution 1201 for the substrate PA, a current density distribution 1202 for the substrate PB, and current density distributions 105 for the respective connecting components cnt.

The 3-dimensional thermal fluid analysis unit 406 converts the current density distribution 1201 for the substrate PA into, for example, a heat generation density distribution for the substrate PA. The 3-dimensional thermal fluid analysis unit 406 converts the current density distribution 1202 for the substrate PB into, for example, a heat generation density distribution for the substrate PB. The 3-dimensional thermal fluid analysis unit 406 converts the current density distributions 105 for the respective connecting components cnt into, for example, heat generation density distributions for the respective connecting components cnt. Conversion of the current density distribution into the heat generation density distribution means conversion of current densities [A/m$^2$] into respective heat generation densities [W/m$^3$].

The 3-dimensional thermal fluid analysis unit 406 sets each of the heat generation density distributions in the corresponding elements of the 3-dimensional model 500 and performs the 3-dimensional thermal fluid analysis, thereby deriving an entire temperature distribution. Therefore, information for indicating the temperature distribution is stored in the storage unit 411, as the temperature distribution information 425.

Figure 13:
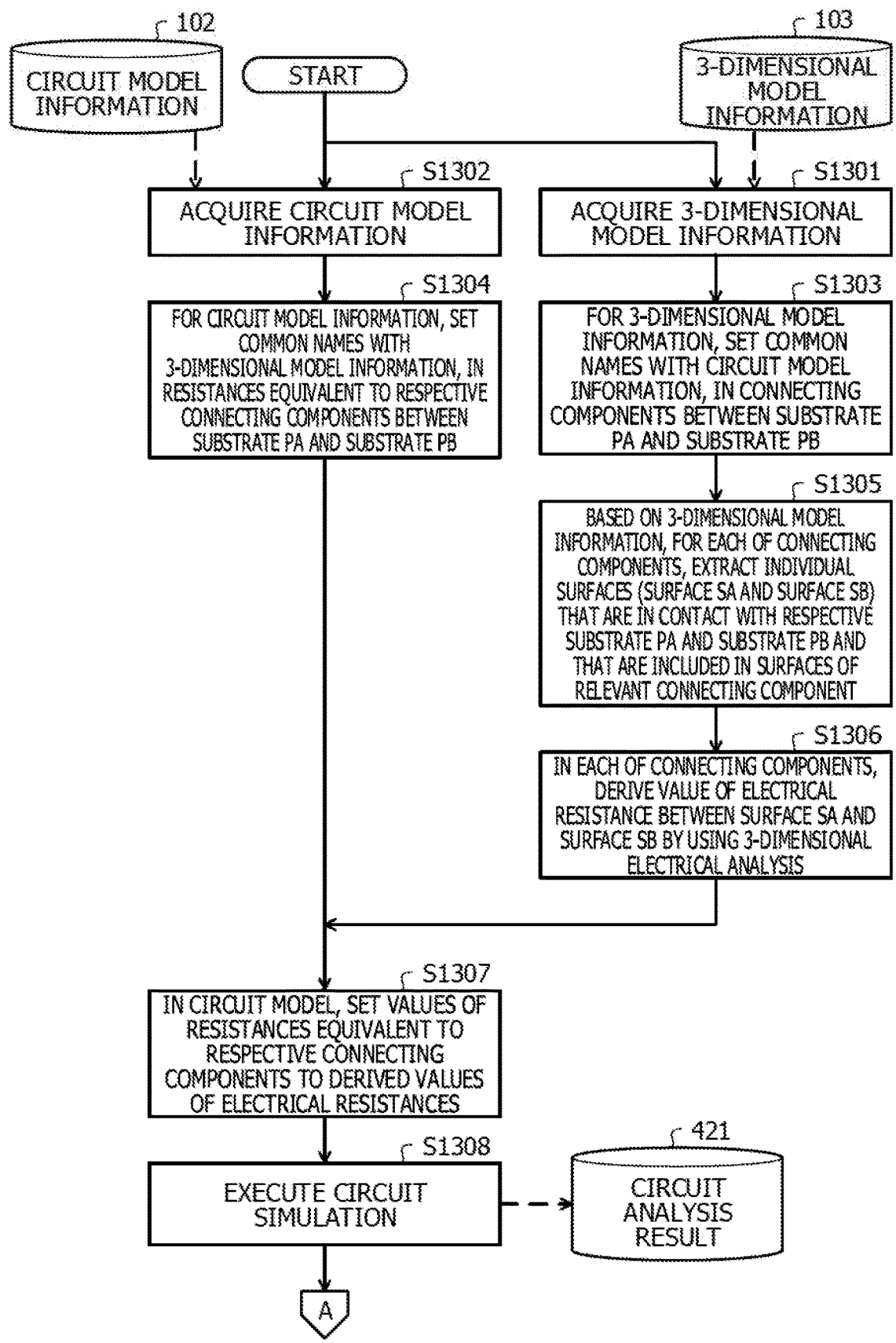
FIG. 13 illustrates an example of temperature calculation processing performed by the information processing device.

FIG. 13 and FIG. 14 illustrate an example of temperature calculation processing performed by the information processing device. First, the information processing device 100 acquires the 3-dimensional model information 103 (operation S1301). The 3-dimensional model information 103 may be information for dividing an object of an analysis target into meshes and for indicating a shape by using elements. The information processing device 100 acquires the circuit model information 102 (operation S1302). The circuit model information 102 may be information in which a circuit model including a circuit equivalent to the substrate PA, a circuit equivalent to the substrate PB, and resistances equivalent to the respective connecting components cnt is described in the SPICE description format. The 3-dimensional model information 103 and the circuit model information 102 may be acquired by being read from the storage unit 411 or the like or may be acquired from another device via the network 310. The information processing device 100 may generate the 3-dimensional model information 103 and the circuit model information 102, thereby acquiring the 3-dimensional model information 103 and the circuit model information 102.

For the 3-dimensional model information 103, the information processing device 100 sets common names with the circuit model information 102, in the connecting components cnt that each connect the substrate PA and the substrate PB (operation S1303). For the circuit model information 102, the information processing device 100 sets common names with the 3-dimensional model information 103, in the resistances R equivalent to the respective connecting components cnt that each connect the substrate PA and the substrate PB (operation S1304). The names may be, for example, inductance names of the respective resistances R.

Based on the 3-dimensional model information 103, for each of the connecting components cnt, the information processing device 100 extracts individual surfaces that are in contact with the respective substrate PA and substrate PB and that are included in surfaces of the relevant connecting component cnt (operation S1305). The information processing device 100 defines, as the surface SA, a surface that is in contact with the substrate PA and that is included in the surfaces of the relevant component and defines, as the surface SB, a surface that is in contact with the substrate PB and that is included in the surfaces of the relevant component.

Based on the 3-dimensional model information 103, in each of the connecting components cnt, the information processing device 100 derives a value of an electrical resistance between the surface SA and the surface SB by using the 3-dimensional electrical analysis (operation S1306). At a time of performing the 3-dimensional electrical analysis, the information processing device 100 sets values of voltages for respective elements or nodes of the surface SA and the surface SB and performs the 3-dimensional electrical analysis, based on the set values of voltages.

In the circuit model expressed by the circuit model information 102, the information processing device 100 sets the values of the resistances equivalent to the respective connecting components cnt to the derived values of electrical resistances (operation S1307). The information processing device 100 executes a circuit simulation (operation S1308).

In the 3-dimensional model 500, for the surface SA and the surface SB of each of the connecting components cnt, the information processing device 100 sets a value of a current conducted through the relevant connecting component cnt and voltage values of respective end portions of the relevant connecting component cnt, obtained by the circuit simulation (operation S1401). Based on the set current values and the set voltage values, the information processing device 100 performs the 3-dimensional electrical analysis, thereby deriving the current density distributions 105 of the respective connecting components cnt (operation S1402). The information processing device 100 converts the current density distributions 105 for the respective connecting components cnt into heat generation density distributions (operation S1403).

The information processing device 100 derives the current density distribution 1201 for the substrate PA by using the 2.5-dimensional analysis (operation S1404). The information processing device 100 converts the current density distribution 1201 for the substrate PA into a heat generation density distribution (operation S1405).

The information processing device 100 derives the current density distribution 1202 for the substrate PB by using the 2.5-dimensional analysis (operation S1406). The information processing device 100 converts the current density distribution 1202 for the substrate PB into a heat generation density distribution (operation S1407).

Based on the individual heat generation density distributions and the 3-dimensional model information 103, the information processing device 100 performs the 3-dimensional thermal fluid analysis, thereby deriving an entire temperature distribution (operation S1408). The information processing device 100 outputs the entire temperature distribution obtained by the 3-dimensional thermal fluid analysis (operation S1409), and thus, a series of processing operations finishes.

The information processing device 100 may perform any one of the processing for calculating the current density distributions for the respective connecting components cnt and the processing for calculating the current density distributions for the respective substrate PA and the substrate PB, in advance of the other thereof.

The information processing device 100 sets, in surfaces of the components in contact with the individual two substrates, values of currents of the respective connecting components that connect the two substrates, the values of currents being calculated by the circuit analysis, and performs an electrical analysis, thereby calculating the current density distributions of the respective components. Since the current density distributions in the respective connecting components cnt are obtained, temperature distributions based on the current density distributions are set in the respective connecting components cnt at a time of a thermal fluid analysis of the substrates. Therefore, temperature information of the substrates including the connecting components cnt is obtained.

The electrical analysis set in the surfaces of the components in contact with the individual substrates is the 3-dimensional electrical analysis, and accordingly, current density distributions corresponding to the shapes of the respective connecting components cnt are obtained. Therefore, the accuracy of the current density distributions may be improved.

Based on the 3-dimensional model information 103, the information processing device 100 performs an electrical analysis in a case where predetermined voltage values are set in the respective surfaces of the components in contact with the individual substrates, thereby calculating the values of the resistances equivalent to the components. The values of the respective resistances are estimated with the higher degree of accuracy, and accordingly, the accuracy of a simulation of the values of currents conducted through the respective components may be improved. Therefore, the accuracy of the temperature information of the substrates including the connecting components cnt may be improved.

Based on the 3-dimensional model information 103, the information processing device 100 performs an electrical analysis in a case where calculated values of currents are set for respective surfaces, in which the two substrates are in contact with the components, and values of voltages in respective end portions of the resistances, obtained by the circuit simulation, are set. Therefore, since the values of the resistances are estimated with the higher degree of accuracy, the accuracy of a simulation of the values of currents conducted through the respective components may be improved. Therefore, the accuracy of the temperature information of the substrates including the connecting components cnt may be improved.

Based on the current density distributions of the respective two substrates and the calculated current density distributions of the respective components, the information processing device 100 performs the 3-dimensional thermal fluid analysis, thereby calculating the temperature distributions of the two substrates and components. Since the temperature information of the substrates including the connecting components cnt is easily obtained, simplification of the design of substrates operable under a high-temperature environment may be achieved.

The information processing device 100 converts the current density distributions into the respective heat generation density distributions and performs, based on the individual converted heat generation density distributions, the 3-dimensional thermal fluid analysis, thereby calculating the temperature distributions of the 2 substrate and the components. The temperature information of the substrates including the connecting components cnt is easily obtained, and thus, simplification of the design of substrates operable under a high-temperature environment may be achieved.

The above-mentioned temperature calculation method may be realized by executing a temperature calculation program, prepared in advance, by using a computer such as a personal computer or a workstation. The present temperature calculation program is recorded in a computer-readable recording medium such as a magnetism disk, an optical disk, or a universal serial bus (USB) flash memory and is read from the recording medium by the computer, thereby being executed. The temperature calculation program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A calculation method for a substrate, the calculation method comprising:
 calculating, by a computer, by performing a circuit simulation based on model information which corresponds to three-dimensional model information representing a target model of an analysis including at least two substrates and a component that joins the at least two substrates in such a manner that one surface of the component is in contact with one of the at least two substrates and the other surface of the component is in contact with the other of the at least two substrates and includes a resistance equivalent to the component, a value of a current that flows through the component or voltage values in the one surface and the other surface;

setting, in the three-dimensional model information, the calculated current value or the calculated voltage values in the one surface and the other surface;

calculating a first current density distribution of the component by performing a 3-dimensional electrical analysis on the component in which the calculated current value or the calculated voltage values are set in the three-dimensional model information;

converting the first current density distribution of the component into a first heat generation density distribution of the component;

calculating a second current density distribution of the one of the at least two substrates by performing a 2.5-dimensional analysis on the one of the at least two substrates;

converting the second current density distribution of the one of the at least two substrates into a second heat generation density distribution of the one of the at least two substrates;

calculating a third current density distribution of the other of the at least two substrates by performing a 2.5-dimensional analysis on the other of the at least two substrates;

converting the third current density distribution of the other of the at least two substrates into a third heat generation density distribution of the other of the at least two substrates;

calculating an entire temperature distribution in the two substrates and the component by performing a 3-dimensional thermal fluid analysis, based on the three-dimensional model information, the first heat generation density distribution, the second heat generation density distribution and the third heat generation density distribution; and outputting the entire temperature distribution in the two substrates and the component.

2. The calculation method according to claim 1, further comprising calculating a value of the resistance by performing, based on the three-dimensional model information, a second electrical analysis in a case where different voltage values are set in the respective first and second surfaces.

3. The calculation method according to claim 2, further comprising in the calculating the current value or the voltages, calculating the current value or the voltage values, based on the circuit simulation in a case of setting to the value of the resistance.

4. An information processing device, comprising:
a memory that stores a calculation program; and
a processor that performs, based on the calculation program, operations of:
calculating, by performing a circuit simulation based on model information which corresponds to three-dimensional model information representing a target model of an analysis including at least two substrates and a component that joins the at least two substrates in such a manner that one surface of the component is in contact with one of the at least two substrates and the other surface of the component is in contact with the other of the at least two substrates and includes a resistance equivalent to the component, a value of a current that flows through the component or voltage values in the one surface and the other surface;

setting, in the three-dimensional model information, the calculated current value or the calculated voltage values in the one surface and the other surface;

calculating a first current density distribution of the component by performing a 3-dimensional electrical analysis on the component in which the calculated current value or the calculated voltage values are set in the three-dimensional model information;

converting the first current density distribution of the component into a first heat generation density distribution of the component;

calculating a second current density distribution of the one of the at least two substrates by performing a 2.5-dimensional analysis on the one of the at least two substrates;

converting the second current density distribution of the one of the at least two substrates into a second heat generation density distribution of the one of the at least two substrates;

calculating a third current density distribution of the other of the at least two substrates by performing a 2.5-dimensional analysis on the other of the at least two substrates;

converting the third current density distribution of the other of the at least two substrates into a third heat generation density distribution of the other of the at least two substrates;

calculating an entire temperature distribution in the two substrates and the component by performing a 3-dimensional thermal fluid analysis, based on the three-dimensional model information, the first heat generation density distribution, the second heat generation density distribution and the third heat generation density distribution; and outputting the entire temperature distribution in the two substrates and the component.

5. The information processing device according to claim 4, wherein the processor calculates a value of the resistance by performing, based on the model information, a second electrical analysis in a case where different voltage values are set in the respective first and second surfaces.

6. The information processing device according to claim 5, wherein the processor, in the calculating the current value or the voltages, calculates the current value or the voltage values, based on the circuit simulation in a case of setting to the value of the resistance.

7. A non-transitory recording medium storing calculation program which causes a computer to perform processes, the processes comprising:
calculating, by performing a circuit simulation based on model information which corresponds to three-dimensional model information representing a target model of an analysis including at least two substrates and a component that joins the at least two substrates in such a manner that one surface of the component is in contact with one of the at least two substrates and the other surface of the component is in contact with the other of the at least two substrates and includes a resistance equivalent to the component, a value of a current that flows through the component or voltage values in the one surface and the other surface;

setting, in the three-dimensional model information, the calculated current value or the calculated voltage values in the one surface and the other;

calculating a first current density distribution of the component by performing a 3-dimensional electrical analysis on the component in which the calculated current value or the calculated voltage values are set in the three-dimensional model information;

converting the first current density distribution of the component into a first heat generation density distribution of the component;

calculating a second current density distribution of the one of the at least two substrates by performing a 2.5-dimensional analysis on the one of the at least two substrates;

converting the second current density distribution of the one of the at least two substrates into a second heat generation density distribution of the one of the at least two substrates;

calculating a third current density distribution of the other of the at least two substrates by performing a 2.5-dimensional analysis on the other of the at least two substrates;

converting the third current density distribution of the other of the at least two substrates into a third heat generation density distribution of the other of the at least two substrates;

calculating an entire temperature distribution in the two substrates and the component by performing a 3-dimensional thermal fluid analysis, based on the three-dimensional model information, the first heat generation density distribution, the second heat generation density distribution and the third heat generation density distribution; and outputting the entire temperature distribution in the two substrates and the component.

8. The non-transitory recording medium according to claim 7, further comprising calculating a value of the resistance by performing, based on the three-dimensional model information, a second electrical analysis in a case where different voltage values are set in the respective first and second surfaces.

9. The non-transitory recording medium according to claim 8, further comprising in the calculating the current value or the voltages, calculating the current value or the voltage values, based on the circuit simulation in a case of setting to the value of the resistance.

* * * * *